J. N. LANDRY.
LINE HOLDER.
APPLICATION FILED OCT. 24, 1907.
912,387.
Patented Feb. 16, 1909.
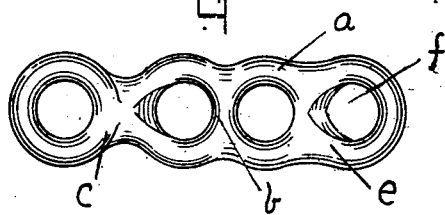
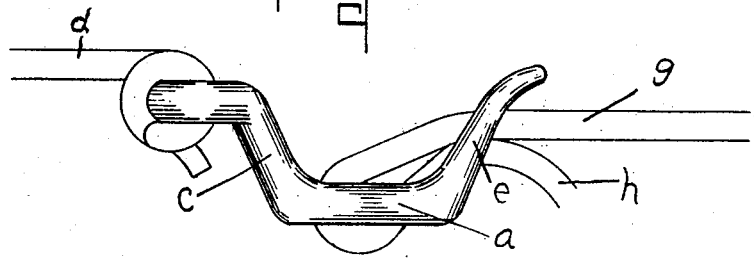
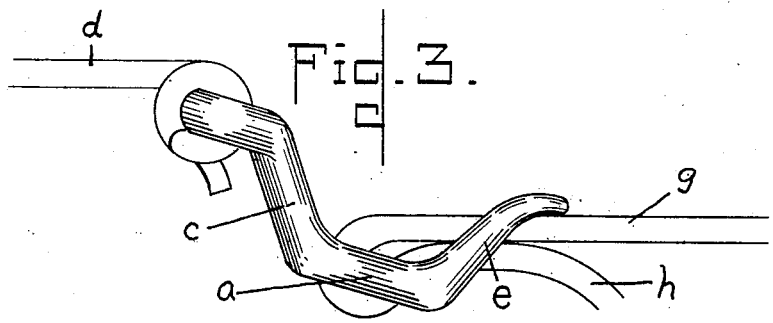
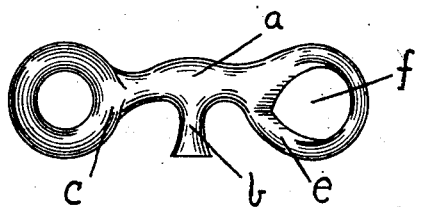
Witnesses.
Emma B. Coleman
Henry G. Toothaker
Inventor.
James N. Landry
By Ward & Joy
Attorneys.

UNITED STATES PATENT OFFICE.

JOSEPH N. LANDRY, OF BRISTOL, CONNECTICUT.

LINE-HOLDER.

No. 912,387.

Specification of Letters Patent.

Patented Feb. 16, 1909.

Application filed October 24, 1907. Serial No. 398,938.

*To all whom it may concern:*

Be it known that I, JOSEPH N. LANDRY, citizen of the United States, residing at Bristol, in the county of Hartford and State of Connecticut, have invented certain new and useful Improvements in Line-Holders, of which the following is a specification.

The object of my invention is to provide a device of the class specified which has features of novelty and advantage.

Referring to the drawings Figure 1 is a plan view of my device. Fig. 2 is a lateral view with lines attached. Fig. 3 shows the device tilted to release the main line. Fig. 4 shows a modification.

My device is preferably made of a single piece of metal. The base —a— has a bearing —b— around which a line passes and which I call a pulley-bearing. To secure my device in place and to properly balance the same I provide a raised arm —c— at the end of which is means for fastening a line or chain. I designate this line as a tie-line —d—. On the opposite end of my device I provide another raised arm —e— in which is arranged an eye —f—. This eye is adapted to receive two lines one above the other, and I prefer that the bottom of the eye should be no wider than the diameter of the lower line.

The method of operation is as follows. After the tie-line is fastened at one end a main line —g— is run through the eye —f— down around the pulley-bearing —b— and back through the eye under the same main line leaving the end to hang free. This free end I call a pulley-line —h— because by pulling the same the main line may be shortened up at will.

It will be noted that the pulley-bearing is out of the normal alinement of the main line —g— so that when the main line is taut it binds against and holds the pulley-line firmly bound in the eye. Consequently it is impossible for the main line to run out but it may be shortened up at will by pulling the pulley-line —h—.

The eye —f— is large enough so that by tilting the arm —e— the pulley-bearing —b— as shown in Fig. 3 will be brought into alinement with the main line. When in this alinement the main line can run out free because then it does not bind the pulley-line in the eye.

The device is especially advantageous for tightening a clothes line or hammock rope and may be used in numerous other ways.

I claim—

1. In a device of the class specified a main line and a pulley line integral with each other, a pulley-bearing an eye adapted to receive both the main-line and pulley-line, said pulley-bearing arranged out of the normal alinement of said main-line, said main-line in its normal position being secure against outward movement and means for drawing said main-line taut, said means consisting of a pulley-line lying in the same plane and under said main-line in the said aperture.

2. In a device of the class specified a main line and a pulley line integral with each other, a raised arm adapted to receive permanent hitch, a base, a pulley-bearing in said base and a raised arm having an aperture therein adapted to receive both the main-line and the pulley-line, said main-line being secure against outward movement, and means for drawing said main-line taut, said means consisting of a pulley-line in its normal position integral with said main-line and lying in the same plane under said main-line in the above said aperture.

3. In a device of the class specified a main line and a pulley line integral with each other, a base, a pulley-bearing in said base, a raised arm having an aperture therein adapted to receive a main-line and a pulley-line, both of said lines lying in approximately the same plane, one above the other in said aperture whereby said main-line is secure against outward movement, and means for drawing said main-line taut consisting of a pulley-line in its normal position.

In testimony whereof I affix my signature in presence of two witnesses.

JOSEPH N. LANDRY.

Witnesses:
JOSEPH H. WARD,
WILLIAM L. NEUBAUER.